US011871748B2

(12) United States Patent
Popp et al.

(10) Patent No.: US 11,871,748 B2
(45) Date of Patent: Jan. 16, 2024

(54) PESTICIDAL COMPOSITION

(71) Applicant: SYNGENTA PARTICIPATIONS AG, Basel (CH)

(72) Inventors: Christian Popp, Stein (CH); Peter Wyss, Basel (CH)

(73) Assignee: SYNGENTA PARTICIPATIONS AG, Basel (CH)

( * ) Notice: Subject to any disclaimer, the term of this patent is extended or adjusted under 35 U.S.C. 154(b) by 0 days.

(21) Appl. No.: 14/381,805

(22) PCT Filed: Apr. 2, 2013

(86) PCT No.: PCT/EP2013/056879
§ 371 (c)(1),
(2) Date: Aug. 28, 2014

(87) PCT Pub. No.: WO2013/149993
PCT Pub. Date: Oct. 10, 2013

(65) Prior Publication Data
US 2015/0045314 A1 Feb. 12, 2015

Related U.S. Application Data

(60) Provisional application No. 61/620,041, filed on Apr. 4, 2012.

(51) Int. Cl.
*A01N 43/90* (2006.01)
*A01N 25/02* (2006.01)

(52) U.S. Cl.
CPC ............. *A01N 43/90* (2013.01); *A01N 25/02* (2013.01)

(58) Field of Classification Search
None
See application file for complete search history.

(56) References Cited

U.S. PATENT DOCUMENTS

| 5,950,360 A * | 9/1999 | Heinrich | A01C 1/06 47/57.6 |
| 6,455,471 B1 * | 9/2002 | Gubelmann-Bonneau | A01N 25/04 504/133 |
| 2003/0166688 A1 * | 9/2003 | Soll | A01N 2300/00 514/341 |

FOREIGN PATENT DOCUMENTS

| CN | 102007926 A | * 4/2011 |
| FR | 2951447 A1 | 4/2011 |
| GB | 2482299 | 2/2012 |
| WO | 2007057028 A1 | 5/2007 |
| WO | 2009027626 A2 | 3/2009 |

OTHER PUBLICATIONS

Machine translations of CN102007926A from espacenet and ProQuest.*
Criado et al. Redox Report, 2007, 12(6), 282-288. (Year: 2007).*
International Search Report from International Application No. PCT/EP2013/056879.

* cited by examiner

*Primary Examiner* — Erin E Hirt
(74) *Attorney, Agent, or Firm* — BakerHostetler; Toni-Junell Herbert

(57) ABSTRACT

Non-aqueous pesticidal macrolide compositions are provided which comprise (A) a major amount of at least one non-aqueous solvent selected from a glycol ether and a lactimide; (B) a minor amount of a mixture of (i) at least one pesticide selected from abamectin and emamectin benzoate, and (ii) optionally, at least one surfactant. In one embodiment, the at least one pesticide selected from abamectin and emamectin benzoate is present in the composition in an amount of at least 7% by weight. In another embodiment, the compositions of the invention are chemically stable. The compositions of the invention can be used directly as a concentrate for treating or reducing tree pest infestations by trunk injection or with dilution in water for control of pests in crops of useful plants.

4 Claims, 2 Drawing Sheets

PESTICIDAL COMPOSITION

This application is a 371 filing of International Application No. PCT/EP2013/056879, filed Apr. 2, 2013, which claims priority benefit to U.S. Provisional Patent No. 61/620,041 filed Apr. 4, 2012, the contents of all of which are incorporated herein by reference.

The present invention relates to a pesticidal macrolide composition, and also relates to a method for treating or reducing pest infestation of trees by injecting an effective amount of the composition into the trunk of the tree.

The challenge involved in developing commercially acceptable products containing agriculturally active compounds continues to increase due to the rapid emergence of more complex customer and regulatory requirements. For example, in the case of scenic trees planted in parks, schools or residential areas, various restrictions have been placed on spraying of pesticides. In order to overcome these restrictions, trunk injection preparations have conventionally been used. For example, arborists may inject liquids, such as insecticides, fungicides, growth regulators, nutrients and/or fertilizers, into the sapwood of tree trunks in an effort to maintain or improve the health of the trees and/or to treat or reduce tree pest infestations.

In order to be effective, tree trunk injection compositions should exhibit excellent chemical stability of the active ingredients and should maintain a high level of physical stability under a severe range of storage and use conditions.

In addition, suitable tree injection compositions should have low a phytotoxicity potential relative to the tree being injected, a dosage level that provides reduced injection times and treatment frequencies, and an acceptable translocation/residue profile for controlling insect and nematode pests that have extended emergence periods, multiple generations per year, have local populations that increase exponentially over time, or are disease vectors.

There continues to be a need for new tree injection compositions and methods for treating or reducing tree pest infestations which allows extended control of insect and nematode pests in trees.

SUMMARY OF THE INVENTION

Pesticidal macrolide compositions are provided which comprise (A) a major amount of at least one non-aqueous solvent selected from a glycol ether and a lactimide; (B) a minor amount of a mixture of (i) at least one pesticide selected from abamectin and emamectin benzoate, and (ii) optionally, at least one surfactant. In one embodiment, the at least one pesticide selected from abamectin and emamectin benzoate is present in the composition in an amount of at least 7% by weight. In another embodiment, the compositions of the invention are chemically stable and are non-aqueous. The compositions of the invention can be used directly as a concentrate for treating or reducing tree pest infestations by trunk injection or with dilution in water for control of pests in crops of useful plants.

BRIEF DESCRIPTION OF THE DRAWINGS

Figure 1:
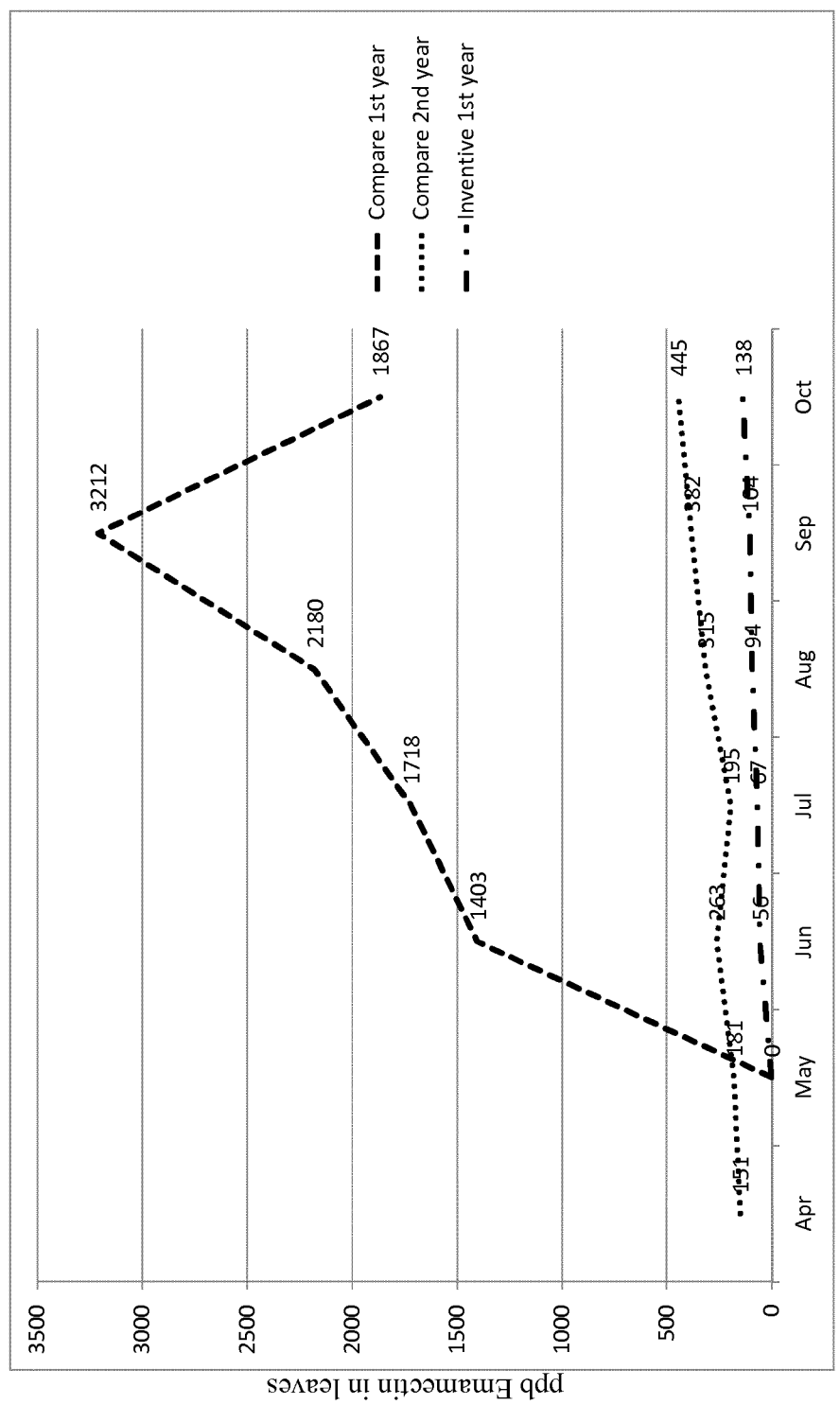
Figure 2:
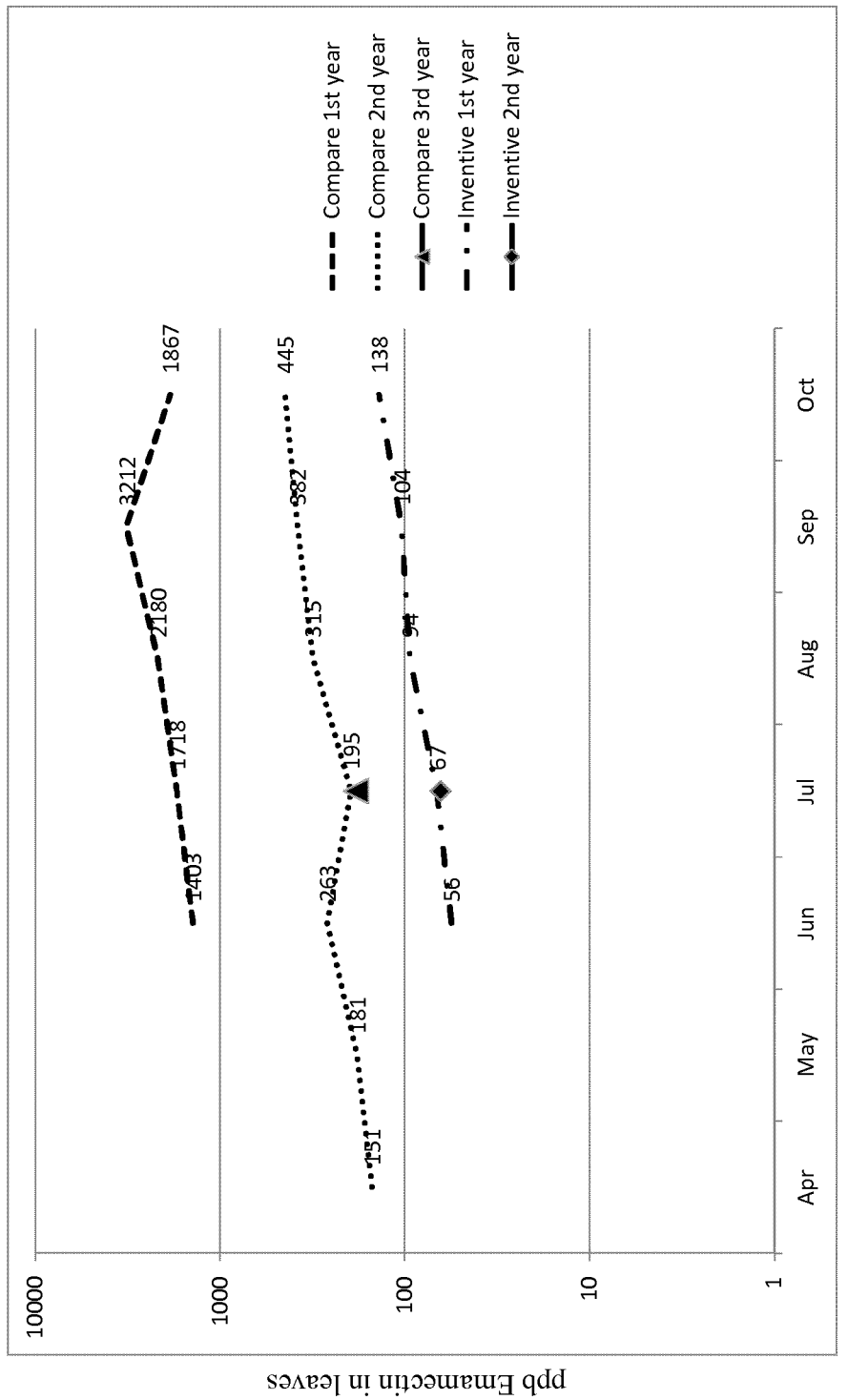

Having thus described the invention in general terms, reference will now be made to the accompanying drawings wherein:

FIG. 1 is a line chart of the translocation data of table 1 regarding a composition of the invention relative to a comparative composition; and FIG. 2 is a logarithmic line chart of the translocation data of table 2 regarding a composition of the invention relative to a comparative composition.

DETAILED DESCRIPTION OF THE INVENTION

In one embodiment, an AL composition of the present invention is prepared by combining at least one non-aqueous solvent selected from a glycol ether and a lactimide and homogenising the solvent with at least one optional surfactant, an optional stabilization agent (e.g., BHT) and then charging at least one pesticide selected from abamectin and emamectin benzoate until dispersed or dissolved.

The term "major amount" as used herein generally means a predominant amount, while a "minor amount" refers to an amount less than a major amount as defined herein. More specifically, the term "major amount" when used with reference to the solvent system means at least 75 wt. % and the term "minor amount" means less than 25 wt. % of the solvent system; more particularly, "major amount" means at least 80% and "minor amount" less than 20%; most particularly, "major amount" means at least 90% and "minor amount" less than 10% by weight of the solvent system.

In one embodiment, the at least one pesticide selected from abamectin and emamectin benzoate is present in the composition in an amount of from 7 to 15% w/v.

The term "stable" as used herein with reference to a pesticidal AL of the invention means meeting or exceeding FAO requirements at ambient storage temperature and at elevated temperature, for example, around 3% breakdown after 2 weeks @54° C., about same level of breakdown after 6 months at RT (20-25° C.), or 4% break down after one year at room temperature.

Accordingly, in one embodiment, the present invention relates to a stable, non-aqueous pesticidal AL composition comprising: (A) a major amount of at least one non-aqueous solvent selected from a glycol ether and a lactimide; (B) a minor amount of a mixture of (i) at least one pesticide selected from abamectin and emamectin benzoate, (ii) optionally, at least one surfactant and (iii) optionally, at least one stabilization agent.

Further, the compositions of the present invention may optionally comprise an active ingredient other than an abamectin or emamectin benzoate.

Examples of additional pesticides include fungicides and plant growth regulators such as paclobutrazole, mandipropamid and propiconazole.

Examples of suitable non-aqueous solvents include glycol ethers such as dialkyleneglycol monoalkyl ether and, more particularly, dipropylene glycol monomethyl ether and isomer mixtures thereof lactimides selected from dialkyl lactimide, more particularly, dimethyl lactamide; and a mixture of dimethyl lactamide and dipropylene glycol monomethyl ether and isomer mixtures thereof. Particular examples of suitable solvents include DOWANOL DPM Glycol ether and AGNIQUE AMD 3L The presence of surfactants is not required in the AL in accordance with the invention. However, in one embodiment, the composition comprises at least one surfactant selected from a non-ionic surfactant, an anionic surfactant and a mixture of anionic and non-ionic surfactants in an amount of from 0 to about 15% by weight, suitably from 0 to about 10% by weight, and more suitably from 0 to 2% by weight.

In one embodiment, the non-ionic surfactant is selected from at least one tristyrylphenol ethoxylate having an average of 16 to 60 oxyethylene units.

In another embodiment, the anionic surfactant is selected from at least one sulfated or phosphated tristylphenol ethoxylates having an average of 6 to 20 and salts thereof.

In an embodiment, the alkoxylated polyarylphenol is a polyethoxylated, arylalkylphenols, such as, for example, 2,4,6-tris(1-phenylethyl)phenol (tristyrylphenol) having an average degree of ethoxylation of between 10 and 80, suitably from 16 to 40, such as SOPROPHOR BSU (RHODIA). Also suitable are EO/PO block copolymers of polyarylphenols, such as SOPROPHOR 796/P (RHODIA) and STEP-FLOW 1500 (STEPAN); tristyrylphenol ethoxylates having an average of 16 to 60, suitably 16 to 50, oxyethylene units; moreover sulfated or phosphated tristylphenol ethoxylates having an average of 6 to 20, suitably 7 to 16, oxyethylene units, and also salts of these substances; wherein specific mention may be made of commercial products known under the names Soprophor FLK (from Rhodia), Soprophor 3 D33 (from Rhodia), and Soprophor S/40-P (from Rhodia); and ethoxylated tristyrylphenol sulphate, ammonium salt.

In another aspect, the composition of the invention may contain at least one stabilization agent such as PAP (acid phosphate isopropyl) and BHT (2,6-di(tert-butyl)-4-methylphenol) in an amount, for example, of from 0 to 3% by weight; or from 0.5 to 2% by weight. Examples of the other suitable formulation auxiliaries in coloring agents such as pigments and dyes, for example.

In one embodiment, the composition of the invention may generally be used to combat or control infestation of plant species by pests by diluting an amount of the inventive AL concentrate composition with a suitable liquid carrier, such as water or liquid fertilizer, and applying the dilute solution to the plant, tree, animal or locus as desired by foliar spray, or by macro infusion of trees with dilute solutions or by tree micro infusion when using more concentrated solutions. The selection of application rates relative to providing a desired level of pesticidal activity for a composition of the invention is routine for one of ordinary skill in the art based on currently existing product labels directions for use of abamectin and emamectin benzoate products.

Suitable crops of useful plants for treatment by dilute spray solutions prepared from the inventive AL concentrate by foliar spray include canola, cereals such as barley, oats, rye and wheat, cotton, maize, soya, sugar beets, fruits, berries, nuts, vegetables, flowers, trees, shrubs and turf. The components used in the composition of the invention can be applied in a variety of ways known to those skilled in the art, at various concentrations. The rate at which the dilute compositions are applied will depend upon the particular type of pests to be controlled, the degree of control required, and the timing and method of application. Application rates will depend on factors such as level of pest pressure, plant conditions, weather and growing conditions as well as the activity of the active ingredients and any applicable label rate restrictions.

Advantageously, the AL concentrate in accordance with the invention is particularly suited for use in a method of controlling arthropods such as insects as well as nematode pests in trees by tree injection. The AL composition according to the invention is applied to trees without dilution by tree injection techniques known in the art, including tree micro infusion, tree micro-injection (TMI) and the like, in conifers, broadleaf trees and palms against a broad range of arthropods such as insect pests and mites, as well as nematodes. Arthropods which can be treated and or controlled in the practice of the method of the invention include, for example, leaf and phloem feeding lepidopterous larvae. The composition of the invention is also active against a broad range of insect pests such as hemiptera (foliar and seed bugs), coleoptera (weevils including bark beetles, borers, longhorn beetles), sawflies and mites, and also nematode pests such as pine wood nematodes.

In one embodiment, the AL concentrate composition of the invention is applied into active xylem tissue or sapwood of trees such as amenity, forest, municipal or plantation trees including conifers, broadleaf trees and palms by the use of tree injection methodology and application equipment known in the art. For example, suitable specialized tree injection, micro-injection and micro-infusion equipment includes, but is not limited to, the TREE I.V. micro-infusion system, the QUIK-jet tree micro injection device, the Air/Hydraulic microinjector (Arborjet, Inc. Woburn, MA, USA) as well as the equipment and methodology described and claimed in published international application WO2012/114197 (Syngenta Crop Protection) which is incorporated by referenced herein.

The selection of application rates and tree injection methods relative to providing a desired level of activity against arthropods such as insects or nematodes for a composition of the invention is routine for one of ordinary skill in the art. More specifically, in one embodiment, a determination is made of how many boreholes are to be included in the trunk of a tree, then the boreholes are formed in the tree trunk with a drill bit, plugs are mounted in the boreholes and the composition of the present invention is injected into the boreholes using tree micro-injection equipment. A suitable number of boreholes can be determined by calculating the tree diameter at breast height (DBH; 1.3 M above the ground) measured in cm or inches as the case may be. In one embodiment, the composition is applied in an amount to provide and application rate of from 0.1 to 0.4 g of active ingredient (abamectin or emamectin benzoate) per inch DBH of the tree to be treated. In another embodiment, the composition is applied in an amount to provide and application rate of from 0.04 to 0.16 g of active ingredient per cm DBH of the tree to be treated.

In one embodiment, at least one macrolide selected from abamectin and emamectin benzoate is present in the composition in an amount of from 7 to 15% w/v; or from 7 to 15% w/w.

In another embodiment, at least one macrolide selected from abamectin and emamectin benzoate is the present in the composition in an amount of from 8 to 10% w/v; or from 8 to 10% w/w; in one embodiment, the composition comprises up to 11% emamectin benzoate. In another embodiment, the composition comprises up to 9.5% emamectin benzoate, 2% by weight of a mixture of anionic and non-ionic surfactants, 0.5% by weight BHT and a solvent selected from dipropyleneglycol monomethylether (mixture of isomers).

Advantageously, the concentrate AL compositions of the invention are chemically and physically stable and require significantly less time to inject an effective amount of an active ingredient such as emamectin benzoate or abamectin by tree injection techniques relative to comparable commercially available emamectin tree injection compositions such as TREE-äge™ for example.

In one embodiment, the composition of the invention can be injected 2 to 9 times faster at the comparable high rate 0.4 g of active ingredient per inch DBH in pines and deciduous trees relative to tree injection compositions comprising lower concentrations of emamectin benzoate or abamectin (such as tree injection compositions comprising up to 4% emamectin benzoate).

In one embodiment, the composition of the invention has a translocation/residue profile which is superior to known tree injection compositions, in particular, known emamectin benzoate tree injection compositions. More specifically, injected formulations that provide multiple years of activity must move (spatially) from the original injection site in the xylem tissue into new vascular tissue in order to be effective against insect and nematode pests. Surprisingly, an AL in accordance with the invention will translocate at a more controlled rate from the injection point and through the tree vascular system into the canopy as compared with a commercial standard (TREE-äge™ comprising up to 4% emamectin benzoate). The improved temporal and spatial presentation of the active ingredient in to the tree and the canopy provided by the inventive AL composition and tree injection method of use is particularly suited for circumstances where extended systemic pest activity is desired. For example, extended translocation periods as provided by tree injection with the AL composition of the invention can be useful for control of insect pests having extended emergence periods, multiple generations per year, have populations that are increasing exponentially in a treatment zone of interest, or are disease vectors.

The following examples illustrate further some of the aspects of the invention but are not intended to limit its scope. Where not otherwise specified throughout this specification and claims, percentages are by weight.

Example 1—Demonstration of Superior Translocation/Residue Profile

Comparative Composition: Revive™ (=TREE-age®), a 4% emamectin benzoate composition containing THFA as carrier solvent). (Compare)

Composition of the Invention: a 9.5% w/v emamectin benzoate (EMA) composition containing 2% w/v of a non-ionic/anionic surfactant mixture, 0.5% stabilization agent and dipropyleneglycol monomethylether (mixture of isomers) as carrier solvent. (Inventive)

Dose rate: 0.08 g ai/cm DBH;

Application Comparative: Revive at 6 Jun. 2010 and 30 May 2011;

Application Inventive: 30 May 2011

Replicates: 3 trees per treatment

Analysis/assessments: Per tree 18 leaves from 2 canopy levels and 3 different positions from each level at each time period tested.

TABLE 1

| | | Assessment 2011: (ppb EMA in leaves) | | | | | | |
|---|---|---|---|---|---|---|---|---|
| Composition | Application | April | May | June | July | August | September | October |
| Comparative 2011 | May 2011 | | 0 | 1403 | 1718 | 2180 | 3212 | 1867 |
| Comparative 2010 | June 2010 | 151 | 181 | 263 | 195 | 315 | 382 | 445 |
| Inventive 2011 | May 2011 | | 0 | 56 | 67 | 94 | 104 | 138 |

TABLE 2

| | | Assessment 2011-2012 (ppb EMA in leaves) | | | | | | |
|---|---|---|---|---|---|---|---|---|
| Composition | Persistence | April | May | June | July | August | September | October |
| Comparative | 1st year | 0 | 0 | 1403 | 1718 | 2180 | 3212 | 1867 |
| 2012 | 2nd year | 151 | 181 | 263 | 195 | 315 | 382 | 445 |
| | 3rd year | | | | 183 | | | |
| Inventive 2012 | 1st year | 0 | 0 | 56 | 67 | 94 | 104 | 138 |
| | 2nd year | | | | 64 | | | |

This example shows that an AL in accordance with the invention will translocate at a more controlled rate from the injection point and through the tree vascular system into the canopy as compared with a commercial standard (TREE-äge™ comprising up to 4% emamectin benzoate).

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

We claim:

1. A method of controlling arthropod or nematode pests in trees which comprises injecting into the trunk of a tree an effective amount of a composition, consisting of:
   emamectin benzoate from 8 to 10% w/v;
   a non-ionic/anionic surfactant mixture at about 2% w/v;
   at least one stabilization agent at about 0.5% w/v; and
   a solvent system forming the remainder of the composition wherein the major amount of the solvent system is a dipropylene glycol monomethylether isomer mixture which is at least 75 wt. % of the solvent system; and wherein the emamectin benzoate maintains a controlled translocation to the leaves of the tree for at least one year; and the anionic surfactant is selected from at least one sulfated or phosphated tristyrylphenolethoxylates having an average of 6 to 20 oxyethylene units and salts thereof.

2. The method of claim 1, wherein the non-ionic surfactant is selected from at least one tristyrylphenolethoxylate having an average of 16 to 60 oxyethylene units.

3. The method of claim 1, wherein the composition does not include a lactamide.

4. The method of claim 1, wherein the parts per billion (ppb) of emamectin benzoate in the leaves of the tree one year and one month after the injection is within about 5% of the amount of emamectin benzoate in the leaves of the tree one month after the injection.

\* \* \* \* \*